United States Patent [19]

Urabe et al.

[11] Patent Number: 5,369,409
[45] Date of Patent: Nov. 29, 1994

[54] TIME-SHARING FM RADAR SYSTEM

[75] Inventors: Masanobu Urabe, Saitama; Satoru Komatsu, Tokyo, both of Japan

[73] Assignee: Honda Giken Kogyo Kabushiki Kaisha, Tokyo, Japan

[21] Appl. No.: 116,168

[22] Filed: Sep. 2, 1993

[30] Foreign Application Priority Data

Jun. 17, 1993 [JP] Japan .................................. 5-171252

[51] Int. Cl.⁵ ............................................ G01S 13/34
[52] U.S. Cl. ..................................... 342/133; 342/128
[58] Field of Search .................... 342/59, 70, 128, 133, 342/146

[56] References Cited

U.S. PATENT DOCUMENTS 5,181,037  1/1993  Komatsu .............................. 342/70
5,229,774  7/1993  Komatsu .............................. 342/70

*Primary Examiner*—Mark Hellner
*Attorney, Agent, or Firm*—Lyon & Lyon

[57] ABSTRACT

A time-sharing FM radar system. A plurality of beam radiating and receiving means, an FM signal generating means, a transmitting unit, a receiving unit, and a direction detecting means are configured to minimize power consumption and interference between channels. The beam radiating and receiving means are arranged to radiate partially overlapping beams in space and to receive return beams. The FM signal generating means generates an FM signal. The transmitting unit includes a plurality of transmitting switching circuits each comprised of a plurality of amplifiers. Each amplifier corresponds to one of the beam radiating and receiving means, and is configured to intermittently amplify and distribute a portion of the FM signal generated by the FM signal generating means to its corresponding beam radiating and receiving means. The receiving unit includes a plurality of receiving switching circuits and a single mixer. The receiving switching circuits comprise a plurality of amplifiers each corresponding to one of the beam radiating and receiving means. The amplifiers amplify signals received by the beam radiating and receiving means intermittently and in different timing. The mixer is configured to generate beat signals by mixing received signals output from the receiving switching circuits and a portion of the FM signal generated by said FM signal generating means. The direction detecting means detects a direction to the target based upon a ratio of the amplitude levels of the beat signals.

14 Claims, 7 Drawing Sheets

TIME-SHARING FM RADAR SYSTEM

BACKGROUND OF THE INVENTION

The field of the present invention is time-sharing FM radar systems and, in particular, time-sharing FM radar systems for use in collision avoidance systems.

A radar system, which is mounted on a vehicle such as an automobile and used in conjunction with an alarm system to detect and warn of potential frontal and rearend collisions, can be implemented in various ways. For example, such a radar system can be implemented using either a pulse radar system, which transmits and receives pulsive electromagnetic waves, or an FM radar system which transmits and receives an FM signal. However, it has been recognized that FM radar systems are preferred over pulse radar system, because radar systems used in collision avoidance systems must have a minimum detection range of several decimeters. In FM radar systems, it is preferred to generate a frequency modulated (FM) signal having a frequency varying linearly with time. The generated FM signal is divided into two parts. One part is radiated from an antenna, and the other part is supplied to one input terminal of a mixer as a local FM signal. The radiated beam, if reflected by an object (hereinafter called a "target"), will produce a return beam. The return beam may then be received by an antenna and supplied to a second input terminal of the mixer to be mixed with the local FM signal to produce a beat signal. By detecting the frequency of the beat signal, the phase shift or timing delay between the radiated beam and the return beam may be determined. As the timing delay represents the propagation time required for the radiated beam to travel to and return from the target, the timing delay may be used to calculate the range or distance to the target.

In the prior art FM radar systems described above, it is preferred to use beams in a frequency range above 30 GHz and having a wave length on the order of a millimeter (mm), which beams are rapidly attenuated upon propagation, to avoid interference between microwave transmission systems already in existence. This is because the longest range to be detected is about several hundred meters at most.

FM radar systems may also be used to determine a direction to a target. Such systems generally utilize a plurality of transceivers to detect both a direction to a target and a range to the target. Each antenna is arranged to radiate a beam having substantially the same pattern (or directivity) as the beams radiated by the other antennas. However, each antenna radiates a beam in a slightly different direction from the beam radiated by the other antennas. FM signals of substantially equal amplitude are supplied to the antennas and are radiated therefrom. Those beams, which are reflected by a target, produce return beams, and the return beams may be received by either the same or other antennas. The direction to the target is calculated based upon a ratio or ratios of the amplitudes of the return beams.

There are two ways to avoid interference between the transceivers. One way is to allocate FM signals of different frequencies to each of the transceivers or channels, and the other way is to distribute FM signals of the same frequency to each of the transceivers in different timing. The latter technique, the so-called time-sharing technique, is preferred over the former technique, the so-called frequency-sharing technique, because the latter technique requires a reduced frequency range for operation.

As for the issue of how to implement each of the transceivers, there are two ways. One way is to use a dedicated transmitting antenna and a dedicated receiving antenna separately. The other way is to use only one antenna which is commonly used for both transmitting (radiating) and receiving. In the latter case, FM signals to be transmitted and return beams received are separated using a circulator. The latter antenna system, the so-called transceiving common antenna system, is preferred over the former type, the so-called dedicated antenna system, because the numbers of antennas required can be reduced. This results in a reduction in the overall system size and manufacturing costs. This is especially important in an FM radar system, wherein a relatively large number of antennas are used to detect both a direction to a target and a range to the target. An exemplary time-sharing/common antenna type FM radar system using mm wave FM signals is disclosed in U.S. Pat. No. 5,181,037.

As is shown in FIG. 6, a prior art time-sharing FM radar system may comprise four transceiving common antennas 110a–110d, an FM signal generating unit 120, a transmitting unit 130, a receiving unit 140 and a detection and control unit 150. The FM signal generating unit 120 may comprise a 20 GHz band voltage controlled oscillator 121 including a Gunn diode and sweeper circuit 122. The frequency of the microwave band FM signal generated in the FM signal generating unit 120 is varied with time and comprises a saw tooth wave form as shown in the timing chart of FIG. 7. The FM signal is divided into two parts by power divider 123. One part is supplied to a transmitting switching circuit 131 in the transmitting unit 130, and another part is supplied to a local switching circuit 141 in the receiving unit 140.

The FM signal supplied to the transmitting unit 130 is distributed to each of four triple frequency multipliers 132a–132d successively through the transmitting switching circuit 131 which comprises a plurality of switching elements, such as PIN diodes, and produces transmitting waves TXa–TXd (mm waves of 60 Ghz). Transmitting waves TXa–TXd are shown in the timing chart of FIG. 7. Each of the transmitting waves TXa–TXd is supplied to one of the transceiving common antennas 110a–110d successively through one of the circulators 160a–160d, and each of the transmitting waves TXa–TXd is radiated by one of the transceiving common antennas 110a–110d.

Any of the FM signal beams, which are radiated from the transceiving common antennas 110a–110d and are reflected by a target, will produce return beams which, in turn, may be received by some or all of the transceiving common antennas 110a–110d. The received return beams are separated from the transmitting beams TXa–TXd by the circulators 160a–160d and supplied to the received signal input terminals of mixers 143a–143d. The FM signals supplied from power divider 123 to the transmitting unit are distributed to each of the triple frequency multipliers 142a–142d successively through a receiving switching circuit 141. The resulting signals are referred to herein as local signals Loa–Lod and are shown in the timing chart of FIG. 7. The receiving switching circuit 141 comprises a plurality of switching elements such as PIN diodes. Each of the local signals Loa–Lod is supplied to a local signal input terminal of each of the mixes 143a–143d successively. Beat signals BTa–BTd generated by the mixers 143a–143d are selected by a beat selector 144 and supplied to a detection circuit 150. The timing of operations within the various parts of the system, for example, within switching circuits 131 and 141, is controlled by the timing control signals output from the timing control circuit 152.

The prior art FM radar systems described above are somewhat inefficient, and it is recognized that those systems consume more power than is acceptable in a "battery powered" environment. More specifically, almost all of the electric power consumed by prior art FM radar systems is consumed by a single power amplifier which operates at the final stage of the FM signal generating circuit 121. Moreover, the power of the FM signal which is supplied to the PIN diodes comprising switching circuits 131 and 141 must be increased to compensate for a large on-state insertion loss of about 3 dB which arises when the PIN diodes are rendered conductive. This produces an increase in power consumption by the FM signal generating unit. However, the off-state insertion loss of the PIN diodes which results when the diodes are rendered nonconductive is not that large. Thus, the FM signal may leak into unexpected transmitting channels through the off-state PIN diodes and cause an increase of interference between channels.

Further, in prior art time-sharing FM radar systems, such as that shown in FIG. 6, an FM signal having a frequency of about 60 GHz is transmitted and received. This is done mainly to reduce the size of the antennas used in those systems. However, because it is difficult to operate switching circuits at such a high frequency after the signal frequency has been multiplied three times, the same number of frequency triple multipliers as the number of channels is used by the switching circuits in both the transmitting unit and the receiving unit. The utilization of multiple triple frequency multipliers adds unnecessary complexity to the FM radar systems of the prior art. Such utilization also adds unnecessarily to overall systems costs and maintenance requirements.

Further, in the FM radar system described above, a large number of antennas are required to increase both angular range of detection of the system as well as the accuracy in detecting a direction to a target. This also increases the size and manufacturing cost of the overall system. The reasons for this are as follows.

An exemplary FM radar system in which four beams, Ba, Bb, Bc, and Bd, are radiated from each of four transceiving common antennas A–D (not shown in the Figure) respectively is shown in FIG. 5. The antennas A–D have the same radiation and receiving pattern (directivity), and the antennas A–D are arranged to radiate beams Ba–Bd in slightly different directions such that the beams partially overlap. Further, assuming that a target has a size and location represented by circle 100 in FIG. 5, the amplitude level of the return beam radiated and received by antenna B (Lb) will be the highest value, and the amplitude level of the return beam radiated and received by antenna A (La) will be next highest value. In contrast, the amplitude levels of the return beams radiated and received by antennas C and D respectively (Lc and Ld) will both be zero. Those skilled in the art will appreciate that the direction to the target may be calculated based upon the amplitude levels La and Lb and the locations and directions of antennas A and B.

To increase the accuracy of the overall system, those skilled in the art will recognize that it is generally desirable to increase the number of return beams having a non-zero amplitude level. This increase in accuracy may be readily achieved by reducing the difference in direction between adjacent beams (i.e., by reducing the setting angles between the antennas). For example, the level of the return beam radiated and received by antenna C (Lc) may be converted to a non-zero value by reducing the setting angle between antennas B and C. Further, assuming that the directions of antennas A, B and C are $\theta a$, $\theta b$ and $\theta c$ respectively, the direction to the target 8 can be calculated as follows.

$$\theta = (La \cdot \theta a + Lb \cdot \theta b + Lc \cdot \theta c) / (La + Lb + Lc)$$

In this way, a direction to a target can be detected more accurately. However, the reduction of setting angles between antennas leads to a reduction in the angular range of detection of the four beams Ba–Bd. As a result, an increased number of antennas is required if it is desired to increase both the accuracy of detection and the angular range of detection of the overall system. This results in an increase in overall system size and manufacturing costs.

Finally, in the time-sharing FM radar systems of the prior art (shown in FIG. 6), each of the mixers 143a–143d corresponds to one of the transceiving common antennas 110a–110d, and the outputs from the mixers are selected by beat selector 144. However, the levels of the beat signals and noises which are output from each of the mixers will be different as shown in FIG. 8. As an example, even if the same received return beams and local signals are supplied to each of the mixers, the output of the mixers will differ because each of the mixers 143a–143d will have mixing characteristics which differ from those of the other mixers. As a result, the beat signals generated by each mixer may differ substantially, and any direction calculated based upon those signals may be erroneous.

SUMMARY OF THE INVENTION

It is an object of the present invention to provide a time-sharing FM radar system wherein the amount of electric power consumed by the system and interference between channels are reduced.

Another object of the present invention is to provide a time-sharing FM radar system comprised of a minimum number of elements or components.

Still another object of the present invention is to provide a time-sharing FM radar system in which both the accuracy of detection and angular range of detection can be increased using only a limited number of antennas.

Another object of the present invention is to provide a time-sharing FM radar system in which degradation of detection accuracy caused by differences in mixing characteristics of the mixers can be reduced.

These and other objects of the present invention may be attained by utilizing a time-sharing FM radar system in accordance with the present invention.

In one embodiment, a time-sharing FM radar system in accordance with the present invention may comprise a plurality of beam radiating and receiving means, an FM signal generating means, a transmitting unit, a receiving unit, and a direction detecting means. The beam radiating and receiving means are arranged to radiate partially overlapping beams in space and to receive return beams. The radiated beams have substantially the same patterns, and the return beams are produced upon the reflection of a radiated beam by a target. The FM signal generating means generates an FM signal having a frequency varying with time and having a substantially constant amplitude. The transmitting unit includes a plurality of transmitting switching circuits each comprised of a plurality of amplifiers. Each of the amplifiers corresponds to one of the beam radiating and receiving means, and is configured to intermittently amplify and distribute a portion of the FM signal generated by the FM signal generating means to its corresponding beam radiating and receiving means.

The receiving unit includes a plurality of receiving switching circuits and a single mixer. The receiving switching circuits comprise a plurality of amplifiers each of which corresponds to one of the beam radiating and receiving means. The amplifiers amplify signals received by the beam radiating and receiving means intermittently and in different timing. The mixer is configured to generate beat signals by mixing received signals output from the receiving switching circuits and a portion of the FM signal generated by said FM signal generating means. The direction detecting means detects a direction to the target based upon a ratio of the amplitude levels of the beat signals output from the mixer and the location of the beam radiating and receiving means.

According to the time-sharing FM radar system of the present invention, FM signals generated in the FM signal generating means are supplied to each of the beam transmitting and receiving antennas for successive radiation through amplifiers which amplify the FM signal intermittently and in different timing with respect to each other. Each of the amplifiers corresponds to one of the beam transmitting and receiving antennas. The number of amplifiers N is the same as the number of antennas. However, the operating duty cycle required to distribute transmitting power to each of the corresponding antennas of each of the amplifiers is reduced by a factor of N. Thus, the total power consumption of N amplifiers will be equal to that of one amplifier which operates continuously. Further, unlike prior art systems, the system of the present invention does not utilize a plurality of PIN diodes at the next stage following the amplifiers. Thus, the power of the FM signal output from the amplifiers may be reduced by 3 dB when compared to the systems of the prior art. As a result, the total amount of power consumed by N amplifiers may be reduced to one-half the amount of power consumed by a single continuously operating amplifier disposed in a prior art system.

Further, in the system of the present invention, interference between channels is substantially reduced in comparison to the systems of the prior art. This reduction in interference is achievable because the difference between gain, while each amplifier is operating, and insertion loss, while each amplifier is not operating, substantially exceeds the difference between the on-state insertion loss and off-state insertion loss of a PIN diode.

In the system of the present invention, a plurality of received signals are selectively amplified by the amplifiers and supplied to a single mixer. This approach is fundamentally different from the approach taken by prior art systems wherein a mixer is provided for each of the beam radiating and receiving means, and wherein local signals are supplied to each of the mixers in a time-sharing manner. Thus, in the system of the present invention, the number of mixers is reduced. Manufacturing costs and the labor required to adjust the operating characteristics of the system are likewise reduced. Further, the degradation of detection accuracy inherent in prior art systems is effectively avoided.

According to one preferred embodiment of the present invention, partially overlapping beams of substantially equal power and radiation patterns are radiated successively from the antennas. For example, as shown in FIG. 5, four beams Ba-Bd of substantially equal power and radiation patterns are radiated so as to partially overlap each other. If any of the beams Ba-Bd are reflected by a target, return beams will result. The receiving unit generates beat signals to be used to detect the amplitude levels of return beams received by each of the antennas A-D. As an example, in the case of FIG. 5, the receiving unit generates level detecting signals for detecting Laa, Lab, Lbb, Lbc, etc. Here, Laa is an amplitude level of a return beam which was originally radiated by antenna A, reflected by a target, and received by the same antenna A. Lab is an amplitude level of a return beam which was originally radiated by antenna A, reflected by a target, and received by the adjacent antenna B. Lbb is an amplitude level of a return beam which was originally radiated from antenna B, reflected by a target, and received by the same antenna B. Similarly, Lbc is an amplitude level of a return beam which was originally radiated by antenna B, reflected by a target, and received by the adjacent antenna C, and so on.

Referring to FIG. 5, it can be understood that the amplitude level of return beam Lab should equal the amplitude level of a virtual return beam which could be produced by radiation from a virtual antenna located at the center of antennas A and B and having a virtual directivity Bab, reflection by the target, and reception by that same virtual antenna. The virtual directivity Bab is an overlapped area between the directivities or radiation patterns of antennas A and B (shown by the added shading in the figure). This is so because, for each of the antennas, the directivity when radiating a beam is equal to or the same as the directivity when receiving a beam.

In this way, by receiving a return beam, which was originally radiated by antenna A and reflected by a target, using adjacent antenna B, the same advantages, which may be achieved by adding one more antenna in the center of antennas A and B, are achievable. Similarly, by receiving a return beam, which was originally radiated by antenna B and reflected by the target, using adjacent antenna C, the same advantages, which may be achieved by adding one more antenna in the center of antennas B and C, are attainable. The same is true for the remaining antennas C-D. In this manner, the time-sharing radar system of the present invention, may achieve a wide angular range of detection and high accuracy of detection using only four antennas, whereas the systems of the prior art would require as many as seven antennas to achieve the same results.

The detail of the present invention will be described below in detail with references to the presently preferred embodiments.

DETAILED DESCRIPTION OF THE PREFERRED EMBODIMENTS

Figure 1:
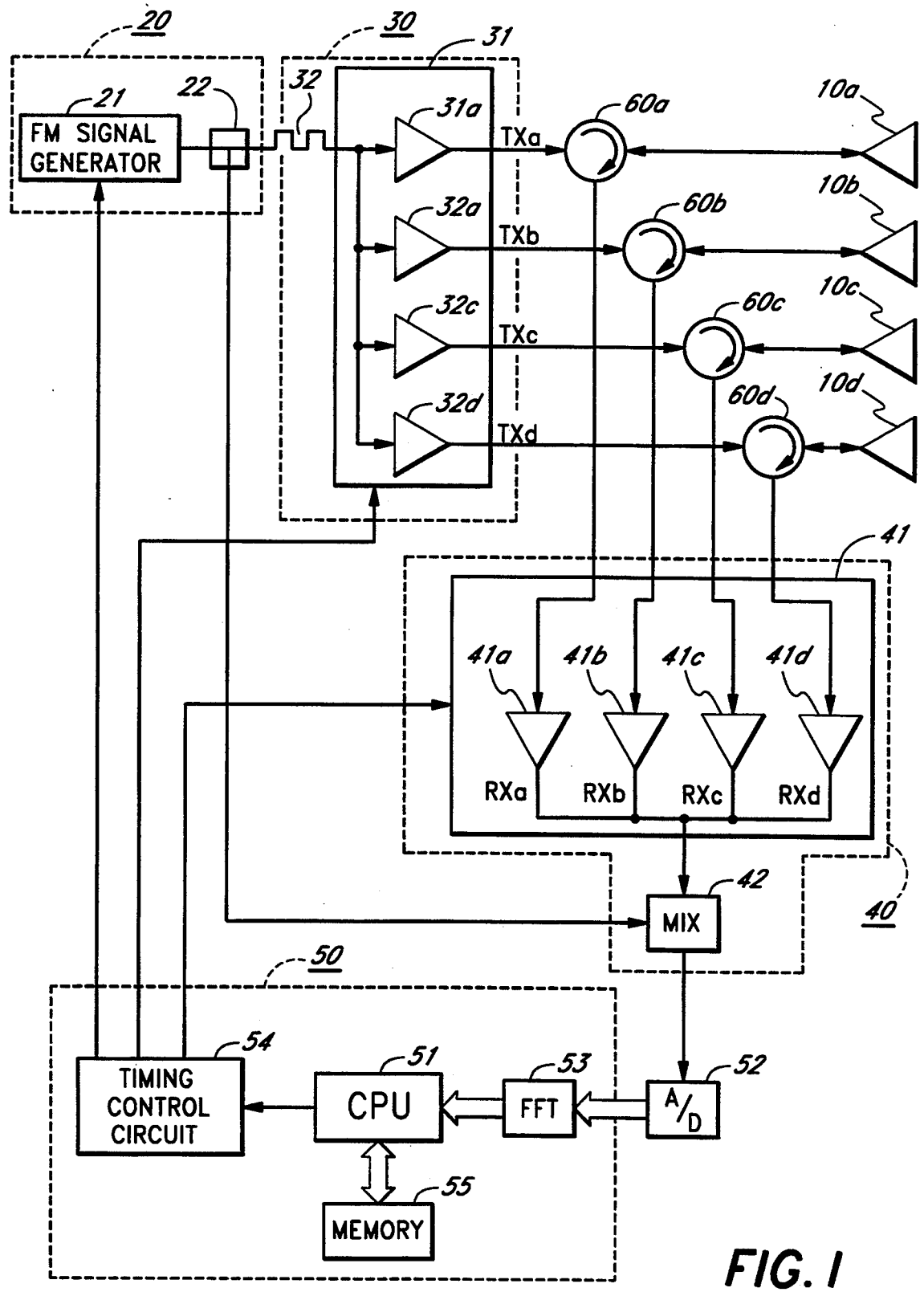
FIG. 1 is a block diagram of a time-sharing FM radar system according to one embodiment of the present invention.

FIG. 1 is a block diagram illustrating a time-sharing FM radar system in accordance with one embodiment of the present invention. The time-sharing FM radar system of the present invention includes four transceiving common antennas 10a–10d, an FM signal generator 20, a transmitting unit 30, a receiving unit 40, a detection and control unit 50, and circulators 60a–60d. The four antennas 10a–10d are set to radiate partially overlapping beams having substantially the same radiation patterns. Antennas 10a–10d may be implemented using an Offset-Defocus-Plaboric-Multibeam antenna comprising a common parabolic reflector and four radiators. The radiators are set in a vicinity of a focus of the reflector but in slightly different directions in relation to the reflector. Antennas 10a–10d can also be implemented by microstrip antennas.

The FM signal generating part 20 comprises an FM signal generator 21 and a power divider 22. The FM signal generator 21 comprises a voltage controlled oscillator (VCO) including a Gunn diode and a varacter diode for oscillating at a frequency of about 30 GHz, and a sweep circuit 22 for supplying a modulation voltage having a saw tooth wave form to the VCO. The FM signal generator may also comprise a frequency multiplier for producing signals having a frequency of about 30 GHz. The transmitting unit 30 comprises a delay circuit 32 for delaying the FM signal divided by power divider 22, and a transmitting switching circuit 31 for supplying the FM signal to the transceiving common antennas 10a–10d through circulators 60a–60d in a time-sharing manner. The delay circuit 32 is configured to shift the frequency of the beat signal which is generated by the mixer 42. More specifically, the delay circuit 32 shifts the frequency of the beat signal to a higher range to reduce interference by 1/f noise produced in the mixer.

The receiving unit 40 comprises a receiving switching circuit 41 and a mixer 42. The receiving switching circuit 41 supplies received return beams which are received by the transceiving common antennas 10a–10d to a single mixer 42 in a time-sharing manner (sequential). The receiving switching circuit 41 also amplifies the return beam received by the transceiving common antennas Pa–Pd. The mixer 42 generates beat signals by mixing received return beams successively supplied from receiving switching circuit 41 and the FM signal supplied from the power divider 22 as a local signal. The detection and control unit 50 comprises a CPU 51, an A/D converter 52, a Fast Fourrier Transformer (FFT) 53 and a timing controller 54 and a memory 55.

The FM signal generating unit 20 generates an FM signal having a nearly constant amplitude level and a frequency which is increased and decreased around 30 GHz within a predetermined period. In a preferred form, the frequency of the FM signal generated varies linearly with time and may be represented as a saw tooth wave form such as that shown in the timing chart of FIG. 3. The FM signal is divided into two parts of nearly equal power level by the power divider 22 and supplied to the transmitting unit 30 and the receiving unit 40 respectively. In the transmitting unit 30, the FM signal supplied from the FM signal generating unit 20 of the preceding stage is selectively amplified in succession by one of four amplifiers 31a–31d to produce FM transmission signals TXa–TXd, each of which is generated in accordance with the timing chart shown in FIG. 3. These transmitting FM signals are supplied to each of the transceiving common antennas 10a–10d through circulators 60a–60d and are radiated from each of the transceiving common antennas 10a–10d successively.

Figure 2:
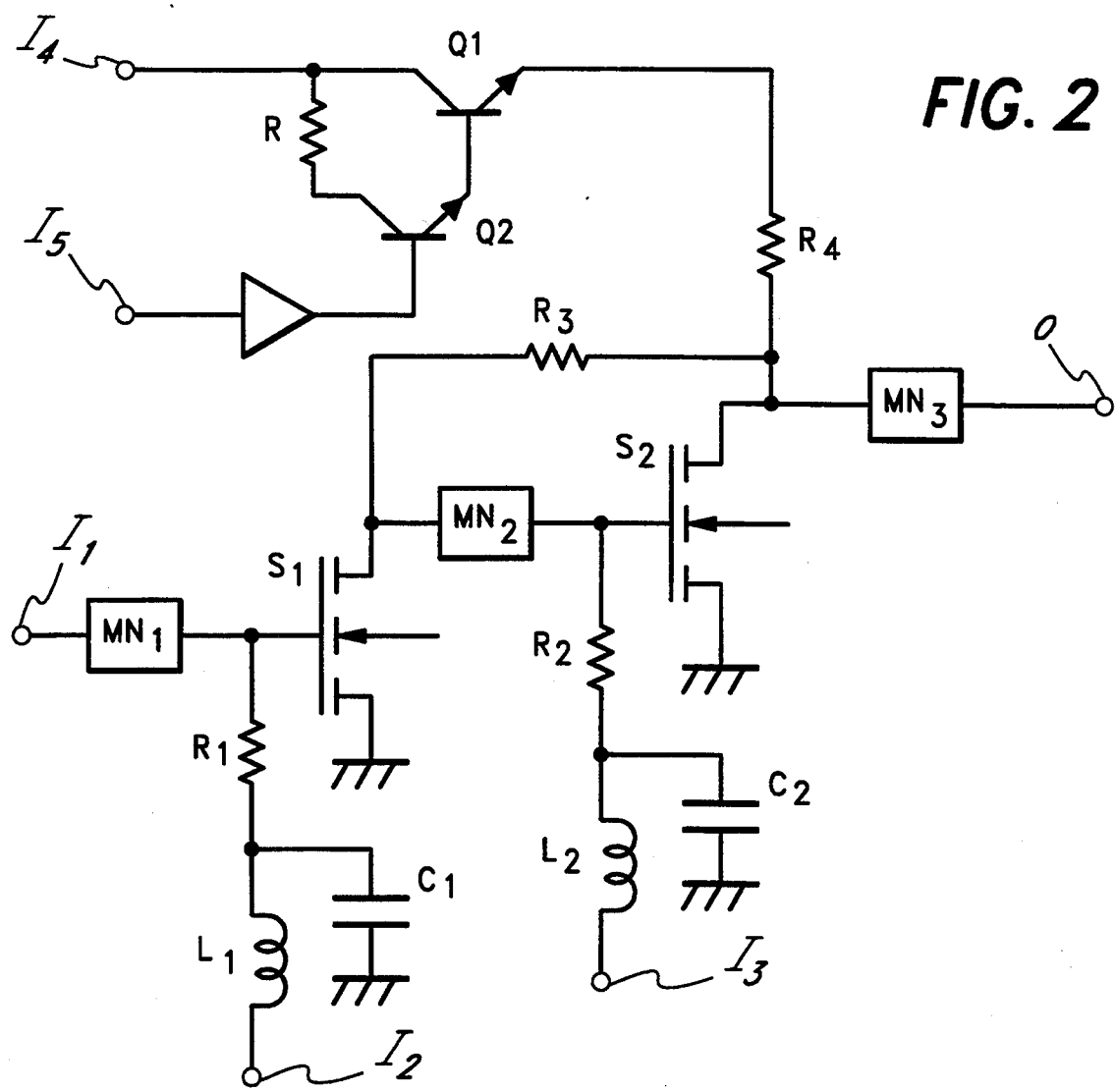
FIG. 2 is a circuit diagram of an exemplary configuration of the amplifier 31a of the transmitting switching circuit 31 shown in FIG. 1.
Figure 5:
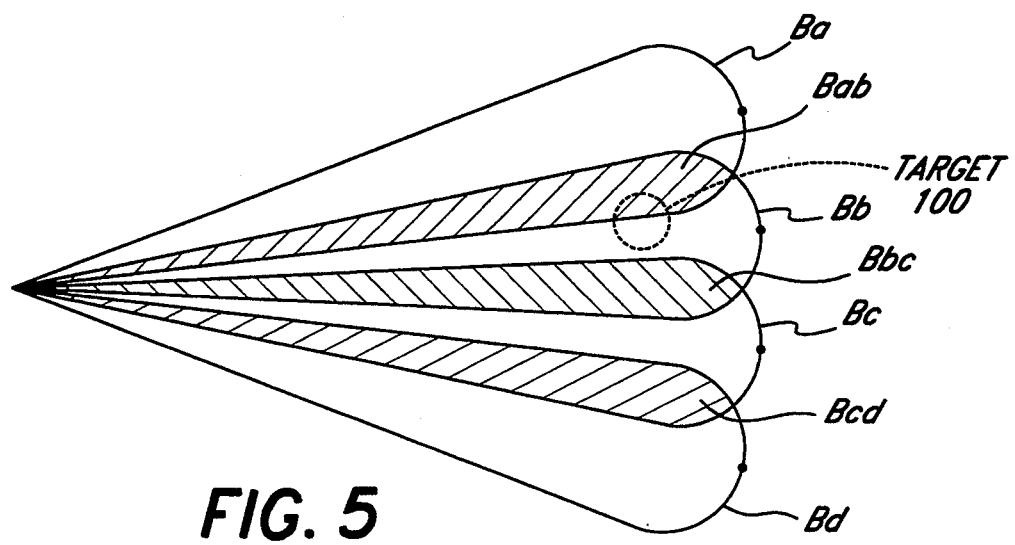
FIG. 5 is a schematic view illustrating the operation of a radar system in accordance with the present invention.

FIG. 2 is a circuit diagram of an amplifier 31a which is representative of amplifiers 31a–31d comprising the transmitting switching circuit 31. The amplifier 31a comprises a pair of field effect transistors (FETs) S1 and S2 which are cascaded; switching transistors Q1 and Q2, which intermittently supply power for operation to the FETs S1 and S2; impedance matching circuits MN1, MN2, and MN3 dispersed between the FETs and between the input/output terminals and the FETs; biasing resistors R1–R4; choke coils L1 and L2; and capacitors C1 and C2. The amplifier or active switching element is formed on a dielectric substrate and comprises a micro-strip type circuit coupled to the power divider 22 and the delay circuit 32 of the preceding stage, and to the receiving switching circuit 41 and the mixer 42 of the following stage. The amplifier amplifies the FM signals which are supplied intermittently to input terminal I1 through the power divider 22 and the delay circuit 32 of the preceding stage and provides amplified FM output signals to output terminal 0 which is connected to circulator 60a of the following stage.

The field effect transistor S1 of the first stage has a gate terminal for receiving the FM signal supplied to input terminal I1 through the impedance matching circuit MN1, a source terminal coupled to ground, and a drain terminal which operates both as a bias input terminal and as an output terminal for the amplified FM signal. The field effect transistor S2 of the second stage has a gate terminal for receiving the FM signal which is output from the drain terminal of the field effect transistor of the first stage through the impedance matching circuit MN2, a source terminal coupled to ground, and a drain terminal which operates both as a bias input terminal and as an output terminal for the amplified FM signal.

The gate terminal of the field effect transistor S1 receives a bias voltage from input terminal I2 through the choke coil L1 and the resistor R1. The gate terminal is coupled to ground through resistor R1 and capacitor C1 which has a low impedance for high frequency signals. Similarly, the gate terminal of the field effect transistor S2 of the second stage receives a bias voltage at input terminal I3 through the choke coil L2 and the resistor R2. The gate terminal is coupled to ground through resistor R2 and capacitor C2 which has a low impedance for high frequency signals. The drain terminal of the field effect transistor S1 which is also the output terminal of the transistor S1, receives drain bias voltage from the input terminal I4 through resistors R4, R3 and switching transistor Q1. Similarly, the field effect transistor S2 receives drain bias voltage from the input terminal I4 through resistors R4 and switching transistor Q1.

Figure 3:
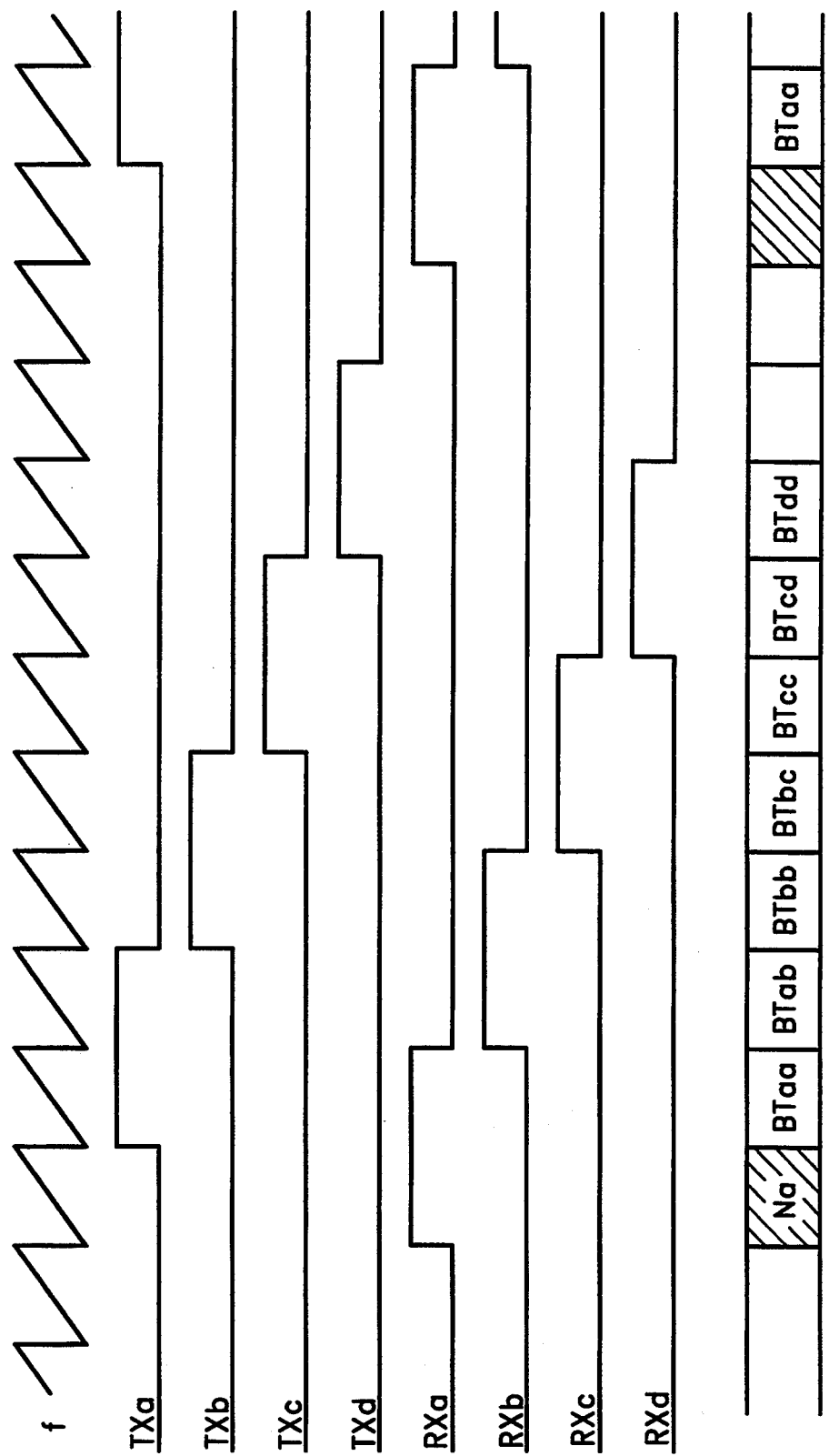
FIG. 3 is a timing chart illustrating one mode of operation of the embodiment shown in FIG. 1.

A timing signal, which achieves a high state intermittently in synch with the timing of the appearance of transmitting signal TXa shown in FIG. 3, is supplied to the input terminal I5 from the control circuit 54 and renders switching transistor Q2 and Q1 active (in on state) intermittently. As a result, the bias voltage on the input terminal I4 is supplied to the field effect transistors S1 and S2 as a drain voltage to intermittently activate the FETs. The FM signal supplied to the input terminal I1 is amplified by field effect transistors S1 and S2 which are activated for amplifying the FM signal by about 10 dB respectively. The amplified FM signal (amplified to a level of about 27 dBm) is supplied to circulator 60a through the output terminal 0. The switching transistors Q1 and Q2 are rendered nonconductive when the timing signal supplied to the input terminal I5 is switched to a low state. As a result, the field effect transistors S1 and S2 are rendered nonactive, which produces near perfect isolation between the input terminal I1 and the output terminal 0.

As described above, in the FM radar system of the present invention, the field effect transistors S1 and S2 are intermittently activated by raising and lowering their respective drain voltages. Thus, the field effect transistors S1 and S2 selectively amplify the FM signal to be supplied to the transceiving common antenna 10a through circulator 60a. It follows that by using a time-sharing FM radar system in accordance with the present invention, the amplitude level of the amplified FM signal can be reduced in comparison to the signals generated by prior art systems. The reduction in amplitude which may be attained is equal to the insertion loss of a PIN diode (typically 3 dB). Further, in the system of the present invention, the isolation between the input and the output terminals of the amplifier becomes almost perfect, because the drain bias voltage supplied to the amplifier may be lowered during selective periods causing the amplifier to be non-active during those periods. Each of the other amplifiers 31b–31d, which comprise the transmitting switching circuit 31 in FIG. 1, is the same as amplifier 31a shown in FIG. 2. Further, each of the amplifiers 41a–41d, which comprise the receiving switching circuit 41, is the same as the amplifier 31a shown in FIG. 2.

Referring to FIG. 1, any of the transmitting beams TXa–TXd radiated from transceiving common antennas 10a–10d which are reflected by a target will produce return beams which may be received by one or more of the antennas 10a–10d. The received return beams are separated from the transmitted signals using circulators 60a–60d and are delivered from the circulators 60a–60d to the amplifiers 41a–41d. The amplifiers 41a–41d are arranged in the receiving switching circuit 41 to correspond to each of the transceiving common antennas 10a–10d. The amplifiers 41a–41d operate successively and intermittently in response to the timing control signals supplied from the timing control circuit 54 and produce received signals RXa–RXd which are supplied to the receiving signal input terminal of the single mixer 42.

The transmitted FM signal is supplied continuously to a local signal input terminal of the single mixer 43 from the FM signal generating unit 20. The received FM signals RXa–RXd are distributed to the mixer 42 successively and have periods in common with the transmitting FM signals supplied to adjacent antennas as shown in FIG. 3. As a result, beat signals BTaa, BTab, BTbb ... are output from the mixer 42 in the sequence as shown in FIG. 3.

Turning now to FIG. 3(b), a signal Na which precedes the beat signal BTaa represents a signal which is output from the mixer 42 during a period in which the received signal RXa is supplied to the mixer 42, but none of the beams is radiated from the four transceiving common antennas A–D. Accordingly, the signal Na comprises a beat signal produced by an external beam received by the transceiving common antenna A, and internal noise produced within the amplifier 41a and the mixer 43a.

In contrast, the signal BTaa is a signal which is output from the mixer 42 during a period in which the transmitting signal TXa is radiated from antenna A and the received signal RXa is supplied to the mixer 42. Accordingly, the signal BTaa is a beat signal generated in mixer 42 by mixing the local signal Lo and a return beam originally transmitted by antenna A, reflected by a target, and received by antenna A.

Figure 4:
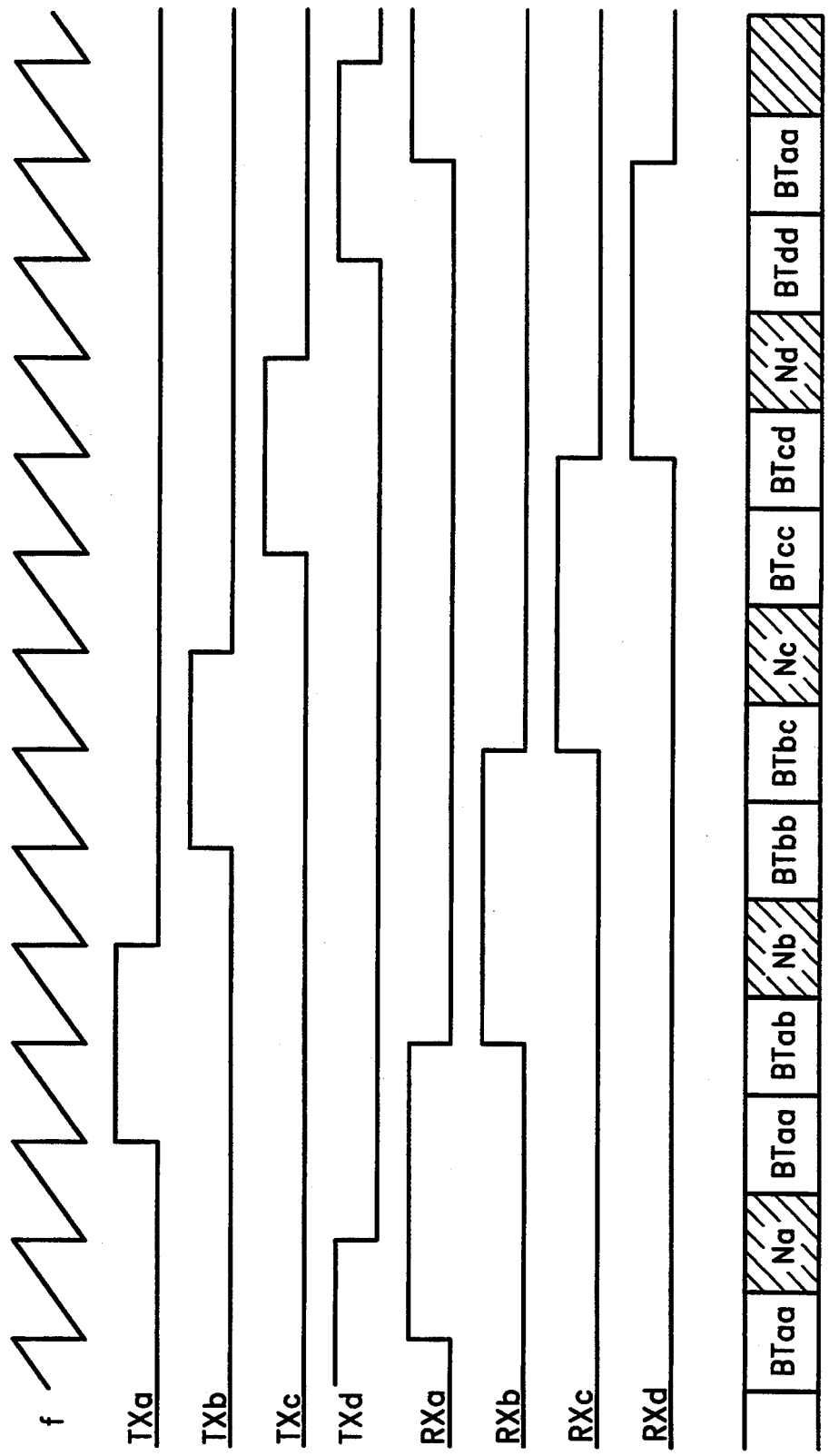
FIG. 4 is a timing chart illustrating another mode of operation of the embodiment shown in FIG. 1.
Figure 6:
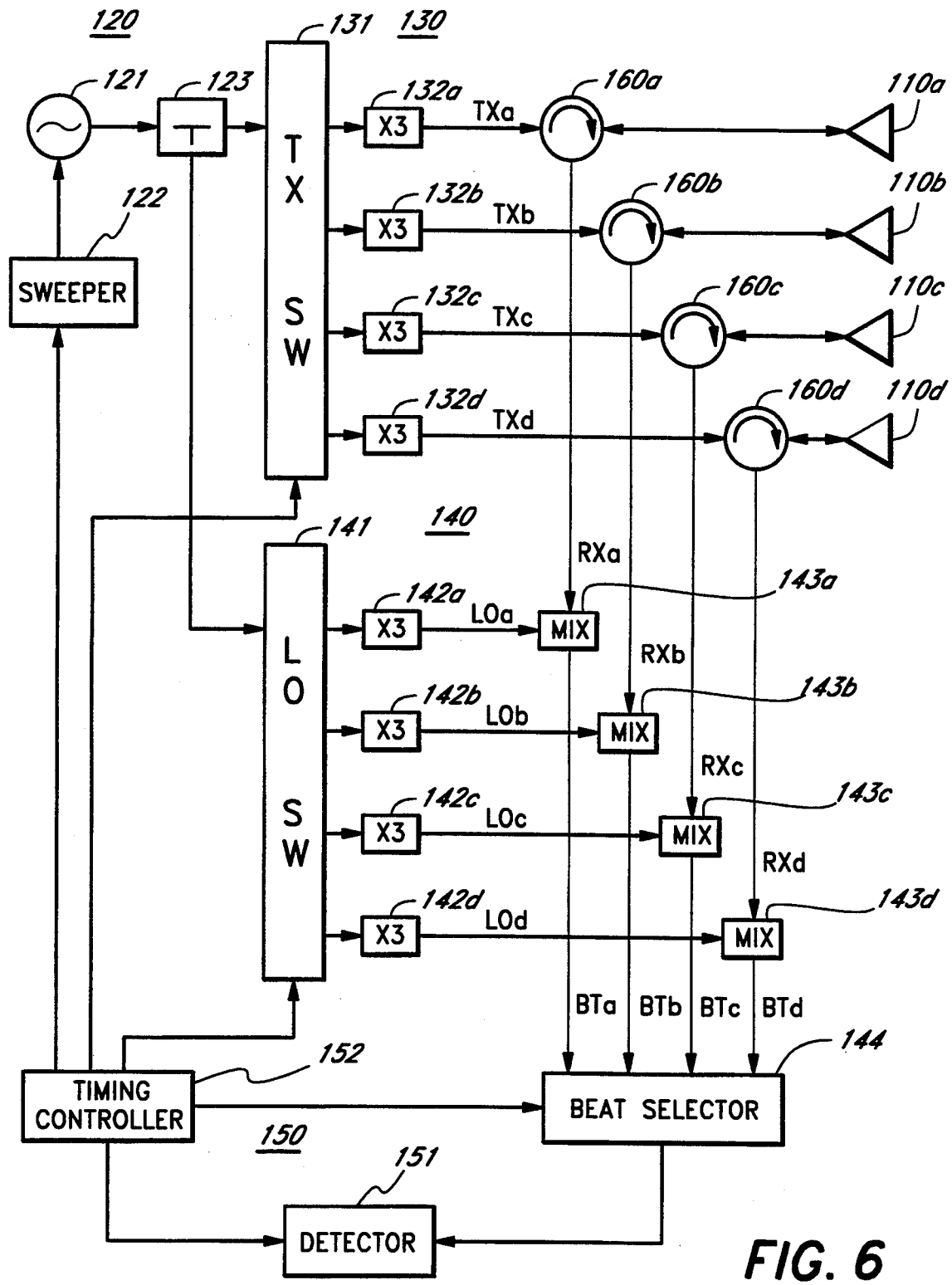
FIG. 6 is a block diagram representing an FM radar system according to the prior art.
Figure 7:
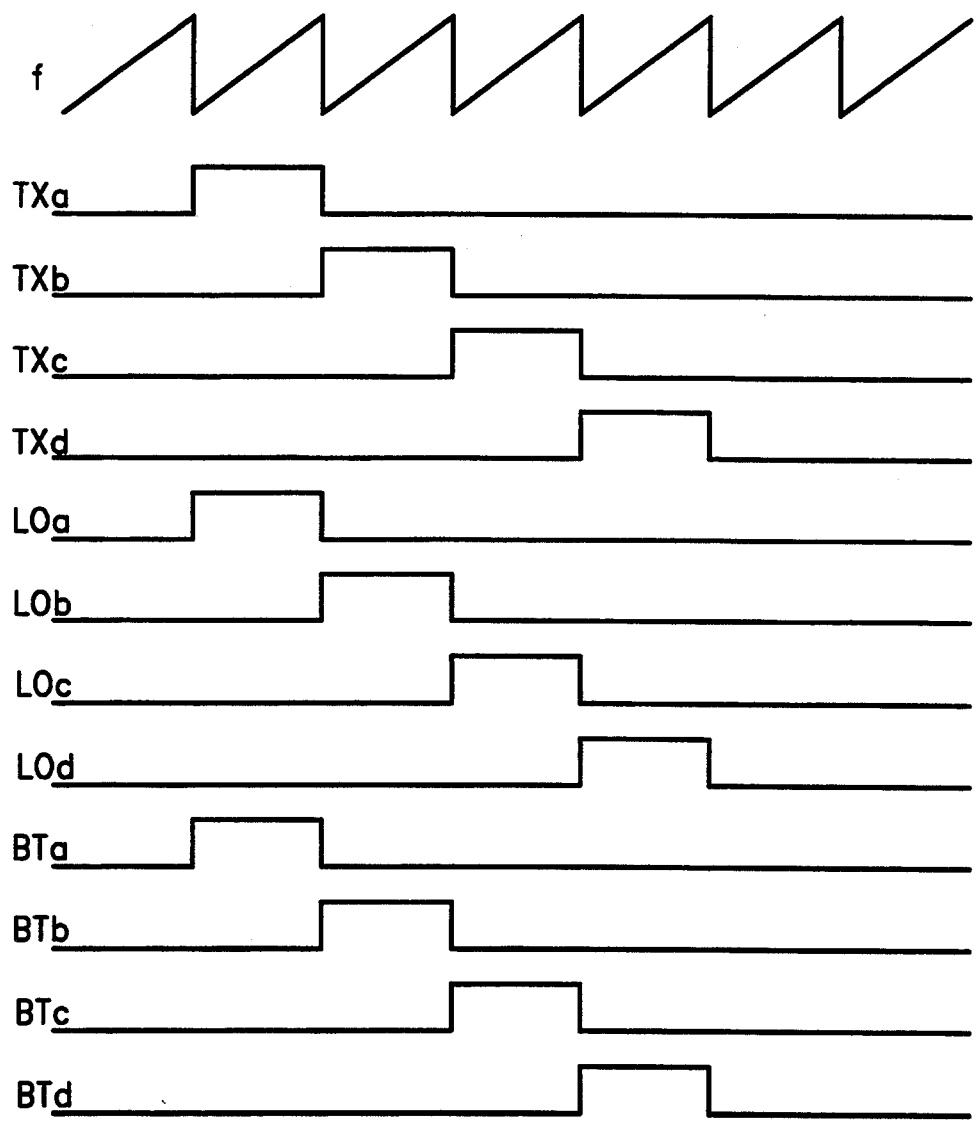
FIG. 7 is a timing chart illustrating the operation of the radar system shown in FIG. 6.
Figure 8:
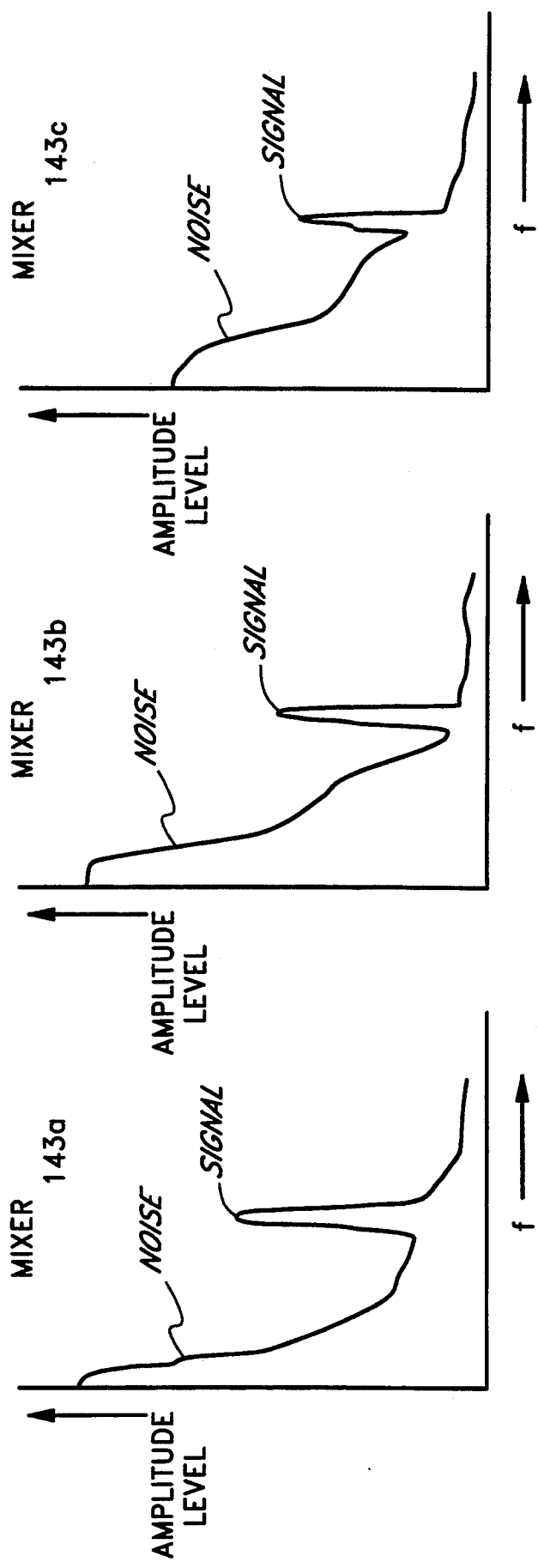
FIG. 8 is a schematic view illustrating the difference in mixing characteristics of the mixers shown in FIG. 6.

Beat signal BTab is a signal which is output from the mixer 43b during a period in which the transmitting beam TXa is radiated from the antenna A and received signal RXb is supplied to the mixer 42. Accordingly, the signal BTab is a beat signal produced from a return beam received by antenna B (the antenna most adjacent to antenna A which radiated the beam TXa to produce the return beam). The beat signal BTab is the same as a signal which might be produced in response to the reception of a virtual return beam which was originally radiated by a virtual antenna located at the center of antennas A and B (and having a virtual directivity Bab as shown in FIG. 4), reflected by a target, and received by that virtual antenna. The beat signal BTbb is also a signal which is output from the mixer 42 during a period in which the signal TXb is radiated from antenna B and the received signal RXb is supplied to the mixer 42. Accordingly, the signal BTbb is a beat signal generated in the mixer 42 by mixing the local signal Lo and a return beam originally radiated by antenna B, reflected by a target, and received by antenna B.

Similarly, beat signal BTbc is produced by a beam originally radiated from antenna B and a return beam received by adjacent antenna C. Likewise, beat signal BTcd is produced by a beam radiated from antenna C and a return beam received by the adjacent antenna D. Finally, beat signal BTcc is produced by a beam radiated from antenna C and a return beam received by the same antenna C and beat signal BTdd is produced by radiation from antenna D and reception of return beam by the same antenna D.

Signal noise Na and the seven beat signals BTaa, BTab, BTbb ... BTdd, which are output from the single mixer 42 are supplied to the detection and control circuit 50. The signal noise Na and each of the beat signals BTaa, BTab, BTbb ... Btdd, which are supplied to the detection and control circuit 50, are converted to digital signals by A/D converter 52, then transformed to frequency spectra by Fast Fourrier Transformer 53, and supplied to the CPU 51. In the CPU 51, seven frequencies faa, fab, fbb ... fdd of the seven beat signals BTaa, BTab, BTbb ... BTdd are processed under appropriate statistical procedure (for example, simply averaged) to provide a final beat frequency. From the final beat frequency, the time interval required for the radiated FM beam to propagate to the target is calculated. Then, from the calculated time interval the range to the target is calculated.

Further in the CPU 51, from among the amplitude levels La, Lab, Lbb . . . Ldd of the seven beat signals BTaa, BTab, BTbb . . . BTdd, some are selected which exceed a predetermined threshold value. The threshold value is set to eliminate noise. The selected amplitude levels of the beat signals are used for weighting a direction of the respective antennas A–D in calculating the average direction of the antennas. For example, where three amplitude levels La, Lab and Lbb of beat signals BTaa, BTab and BTbb are selected, because only they are larger than the threshold value, the direction to the target e is calculated as follows.

$$\theta = (La \cdot \theta a + Lab \cdot \theta ab + Lbb \cdot \theta b)/(La + Lab + Lbb)$$

Here, $\theta ab$ is the direction of a virtual antenna which is assumed to be arranged in the center of antennas A and B. $\theta ab$ is considered to satisfy the following relation.

$$\theta ab = (\theta a + \theta b)/2$$

As mentioned above, signal noise Na comprises a beat signal caused by external electromagnetic waves and internal noise produced within amplifier 41a and the mixer 42. If desired, the frequency spectrum of this noise may be detected in the CPU 51 and stored in a memory 55 for subtraction from the frequency spectra obtained from other beat signals. Thus, when the amplitude levels and frequencies of the other beat signals are detected, any external and internal noise which may also be included in the beat signals may be eliminated. This method is especially useful where the level of external noise changes rapidly and is substantially smaller than the level of internal noise which changes relatively slowly, or where the same external noise is included in all of the beat signals because it does not change.

Another example of operation timing is shown in FIG. 4. More specifically, the periods for detecting noise are distributed among all of the channels. Noise Na shown by added shading in FIG. 4 comprises external noise received by antenna A and internal noise produced in the amplifier 41a and mixer 42. Noise Nb comprises external noise received by antenna B and internal noise produced in the amplifier 41b and mixer 42. Similarly, noise signals Nc and Nd are comprised of external noise received by antenna C and antenna D respectively, and internal noise produced in the amplifiers 41c and 41d respectively and mixer 42. In the CPU 51, frequency spectra of each noise signal are detected and stored in the memory 55 for subtraction from each of the beat signals.

As described above in detail, since the time-sharing FM radar system of the present invention is configured to use only one mixer by switching received signals instead of local signals, the number of elements comprising the FM radar system and labor required to adjust those elements can be reduced, thus reducing the manufacturing cost of the system. Further, the degradation of detection accuracy, which results from the different mixing characteristics of the mixers in prior art systems, can be effectively avoided.

Further, since the time-sharing FM radar system of the present invention is configured to distribute FM signals to the transceiving common antennas intermittently, the output of the amplifiers can be reduced by a value equal to the insertion loss of the PIN diodes (typically 3 dB) used in the prior art systems. This results in a 50% reduction of power consumption by the system.

Still further, since the amplifiers are caused to be non-active (a state of high insertion loss), except during periods of intermittent activity, interference between channels can be reduced.

Finally, since the time-sharing FM radar system of the preferred embodiment of the present invention is configured to receive return beams produced by radiation from one of the transceiving common antennas, using another transceiving common antenna, the same advantages, which can be achieved by adding an additional antenna between adjacent antennas, can be achieved. As a result, high detection accuracy and wide angular range of detection can be achieved using only a limited number of antennas. This results in a reduction in system size and overall manufacturing costs.

While the invention has been described in detail herein with reference to a number of specific embodiments thereof, it will be apparent to those skilled in the art that various changes and modifications, such as those exemplary modifications described below, may be made to the embodiments disclosed without departing from the spirit and scope of the invention as defined by the appended claims.

As an example, while a system is described in which antennas are set to overlap, only two beams radiated adjacent antennas. The antennas could be set such that three or more beams radiated from the antennas overlap. Further, although an example is described in which four antennas are utilized, antennas of appropriate different numbers, for instance, two or three or five, could be utilized.

Further, although an example is described in which homodyne detection is used, heterodyne detection may also be used. Finally, an example is described in which two field effect transistors are connected in cascade. However, only one field effect transistor could be used or, if desired, more than three field effect transistors could be connected in cascade.

What is claimed is:

1. A time-sharing radar system comprising:
   a plurality of beam radiating and receiving means arranged to radiate partially overlapping beams and to receive return beams, each of said radiating and receiving means having a selected location and direction of radiation, said radiated beams having substantially the same patterns, and said return beams being produced upon a reflection of said radiated beams by a target;
   an FM signal generating means for generating an FM signal having a frequency varying with time and having a substantially constant amplitude;
   a transmitting unit including a transmitting switching circuit for distributing a portion of said FM signal generated by said FM signal generating means to the beam radiating and receiving means;
   a receiving unit including a receiving switching circuit and a single mixer, said receiving switching circuit comprising a plurality of amplifiers, each amplifier corresponding to one of said beam radiating and receiving means, each amplifier intermittently and in a pre-determined sequence amplifying signals received by its corresponding beam radiating and receiving means, and said mixer being capable of generating a plurality of beat signals in different timing by mixing received signals output from said receiving switching circuit, with an FM signal related to said FM signal generated by said FM signal generating means;

a direction detecting means for detecting a direction to the target based on a plurality of amplitude levels of said beat signals output from said mixer and the locations and directions of said beam radiating and receiving means; and a range detecting means for detecting a range to the target based on a frequency of said beat signal output from said mixer.

2. A time-sharing radar system according to claim 1 wherein;
said a portion of said FM signal being supplied to said transmitting switching circuit is delayed by predetermined amount in relation to said portion of said FM signal which is supplied to said mixer.

3. A time-sharing radar system according to claim 2 wherein;
said direction detecting means and said range detecting means both include an analog-to-digital converter for converting said beat signals output from said mixer from an analog format to a digital format, and a Fast Fourrier Transformer for transforming said converted digital signals to frequency spectra.

4. A time-sharing radar system according to claim 3, wherein said transmitting switching circuit comprises
a plurality of amplifiers, each of said amplifiers corresponding to one of said beam radiating and receiving means, each of said amplifiers intermittently and in a predetermined sequence amplifying and distributing said portion of said FM signal which is supplied to said mixer; and
wherein said amplifiers comprising said transmitting switching circuit and said receiving circuit comprise:
a field effect transistor having a gate terminal for receiving a signal to be amplified, a source terminal coupled to ground and a drain terminal used as a bias input terminal and FM signal output terminal; and
a bias controlling circuit for controlling said field effect transistor by intermittently raising a bias voltage supplied to said field effect transistor.

5. The time-sharing radar system of claim 1 wherein;
each of said amplifiers of said receiving switching circuit intermittently amplifies signals received by its corresponding beam radiating and receiving means during a period in which beams are radiated from both said corresponding beam radiating and receiving means and a beam radiating and receiving means adjacent to said corresponding radiating and receiving means.

6. A time-sharing radar system according to claim 5 wherein;
said a portion of said FM signal being supplied to said transmitting switching circuit is delayed by predetermined amount in relation to said portion of said FM signal which is supplied to said mixer.

7. A time-sharing radar system according to claim 6 wherein;
said direction detecting means and said range detecting means both include an analog-to-digital converter for converting said beat signals output from said mixer from an analog format to a digital format, and a Fast Fourrier Transformer for transforming said converted digital signals to frequency spectra.

8. A time-sharing radar system according to claim 7, wherein said transmitting switching circuit comprises
a plurality of amplifiers, each of said amplifiers corresponding to one of said beam radiating and receiving means, each of said amplifiers intermittently and in a predetermined sequence amplifying and distributing said portion of said FM signal which is supplied to said mixer; and
wherein said amplifiers comprising said transmitting switching circuit and said receiving circuit comprise:
a field effect transistor having a gate terminal for receiving a signal to be amplified, a source terminal coupled to ground and a drain terminal used as a bias input terminal and FM signal output terminal; and
a bias controlling circuit for controlling said field effect transistor by intermittently raising a bias voltage supplied to said field effect transistor.

9. A time-sharing radar system according to claim 5 wherein;
at least one of said amplifiers of said receiving switching circuit amplifies signals received by its corresponding beam radiating and receiving means intermittently during a period in which a beam is not radiated from any of said beam radiating and receiving means; and
said direction detecting means further includes means for storing said received signals as noise output from said amplifiers during said period and means for subtracting said noise from said beat signals.

10. A time-sharing radar system according to claim 9 wherein;
said a portion of said FM signal being supplied to said transmitting switching circuit is delayed by predetermined amount in relation to said portion of said FM signal which is supplied to said mixer.

11. A time-sharing radar system according to claim 10 wherein;
said direction detecting means and said range detecting means both include an analog-to-digital converter for converting said beat signals output from said mixer from an analog format to a digital format, and a Fast Fourrier Transformer for transforming said converted digital signals to frequency spectra.

12. A time-sharing radar system according to claim 11,
wherein said transmitting switching circuit comprises
a plurality of amplifiers, each of said amplifiers corresponding to one of said beam radiating and receiving means, each of said amplifiers intermittently and in a predetermined sequence amplifying and distributing said portion of said FM signal which is supplied to said mixer; and
wherein said amplifiers comprising said transmitting switching circuit and said receiving circuit comprise:
a field effect transistor having a gate terminal for receiving a signal to be amplified, a source terminal coupled to ground and a drain terminal used as a bias input terminal and FM signal output terminal; and
a bias controlling circuit for controlling said field effect transistor by intermittently raising a bias voltage supplied to said field effect transistor.

13. A time-sharing radar system comprising:
- a plurality of beam radiating and receiving means having a selected location and direction, said beam radiating and receiving means being configured to radiate partially overlapping beams and to receive return beams, said radiated beams having substantially the same patterns, said return beams being produced by reflection of said radiated beams by a target;
- an FM signal generating means for generating an FM signal having a frequency varying with time and having a substantially constant amplitude;
- a transmitting unit including a transmitting switching circuit comprising a plurality of amplifiers, each of said amplifiers corresponding to one of said beam radiating and receiving means, and each of said amplifiers intermittently amplifying and distributing a portion of said FM signal generated by said FM signal generating means to its corresponding beam radiating and receiving means through frequency multipliers;
- a receiving unit including a local switching circuit and a mixer, said local switching circuit comprising a plurality of amplifiers, each amplifier corresponding to one of said beam radiating and receiving means, said amplifiers intermittently amplifying a portion of said FM signal generated by said FM signal generating means, said mixer being configured to generate beat signals by mixing signals received by each of said corresponding beam radiating and receiving means with an FM signal related to said FM signal output from amplifiers;
- a direction detecting means for detecting a direction to the target based upon a plurality of amplitude levels of said beat signals output from said mixer and the locations of said beam radiating and receiving means;
- a range detecting means for detecting a range to the target based upon a frequency of at least one of said beat signals output from said mixer.

14. A time-sharing radar system according to claim 13 wherein;
- each of said amplifiers comprising both of said transmitting switching circuit and receiving circuit comprises:
  - a field effect transistor having a gate terminal for receiving a signal to be amplified, a source terminal coupled to ground and a drain terminal used as a bias input terminal and an FM signal output terminal; and
  - a bias controlling circuit for controlling said field effect transistor by intermittently raising a bias voltage supplied to said field effect transistor.

* * * * *